US 8,091,656 B2
Jan. 10, 2012

(12) United States Patent
Rankin et al.

(54) METHOD AND APPARATUS FOR DELIVERY CART MOVEMENT START AND ENERGY RECOVERY

(75) Inventors: Brent C. Rankin, Lima, OH (US); Wade Shock, Anna, OH (US); Phillip Ford, Union City, IN (US); James K. Tipton, Wapakoneta, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/836,390

(22) Filed: Jul. 14, 2010

(65) Prior Publication Data

US 2010/0276219 A1    Nov. 4, 2010

Related U.S. Application Data

(63) Continuation of application No. 11/689,136, filed on Mar. 21, 2007, now Pat. No. 7,779,941.

(51) Int. Cl.
*B62D 51/04* (2006.01)

(52) U.S. Cl. ..................................... 180/19.1

(58) Field of Classification Search ............... 180/19.1, 180/19.2
See application file for complete search history.

(56) References Cited

U.S. PATENT DOCUMENTS

| | | |
|---|---|---|
| 3,930,548 A | 1/1976 | Wallraff |
| 4,047,599 A | 9/1977 | Rousseau |
| 4,081,048 A | 3/1978 | Hendricks |
| 4,113,043 A | 9/1978 | Palmer |
| 4,386,675 A | 6/1983 | Landon |
| 4,418,784 A | 12/1983 | Fox |
| 5,746,282 A | 5/1998 | Fujiwara et al. |
| 5,816,355 A | 10/1998 | Battlogg et al. |
| 5,842,535 A | 12/1998 | Dennis |
| 6,003,627 A | 12/1999 | Ishida |
| 6,065,557 A | 5/2000 | von Keyserling |
| 6,276,471 B1 | 8/2001 | Kratzenberg et al. |
| 6,343,665 B1 | 2/2002 | Eberlein et al. |
| 6,672,601 B1 | 1/2004 | Hofheins et al. |
| 6,849,984 B2 | 2/2005 | Gallant |
| 6,976,287 B2 | 12/2005 | Muth |
| 7,293,621 B2 * | 11/2007 | Long ............................ 180/165 |
| 7,407,024 B2 * | 8/2008 | Vogel et al. .................. 180/19.3 |
| 2003/0221882 A1 * | 12/2003 | Long ............................ 180/65.2 |
| 2006/0213703 A1 * | 9/2006 | Long ............................ 180/65.2 |
| 2007/0163816 A1 * | 7/2007 | Schena et al. ................ 180/19.1 |

* cited by examiner

*Primary Examiner* — Paul N Dickson
*Assistant Examiner* — Tashiana Adams
(74) *Attorney, Agent, or Firm* — Rankin Hill & Clark LLP

(57) ABSTRACT

A method and apparatus for reducing or eliminating the energy required by an operator of a delivery cart to start the cart moving in a predetermined direction at a predetermined speed as well as to recover some or all of the energy used to start the cart moving. The apparatus includes a cart, a drive wheel, a motor for driving the drive wheel, and a rechargeable energy source to power said motor where the rechargeable energy source is recharged during normal, unpowered movement of the cart. The method includes charging a power source while moving the cart, actuating a directional button to initiate movement in a desired direction, energizing a clutch to couple the motor to the driven wheel, energizing the motor to drive the driven wheel in the desired direction. After a predetermined time period, set by a run timer, the clutch is decoupled while the motor remains activated, and thereafter the motor is deactivated.

19 Claims, 2 Drawing Sheets

METHOD AND APPARATUS FOR DELIVERY CART MOVEMENT START AND ENERGY RECOVERY

The present application is a continuation of application Ser. No. 11/689,136 filed on Mar. 21, 2007, which is expressly incorporated herein by reference.

BACKGROUND

The present invention generally relates to carts and, more particularly, toward delivery carts having means for facilitating movement thereof.

During an assembly process, it is frequently necessary to deliver parts to the assembly line. The parts are generally delivered to the assembly line by material handling personnel. The material handling personnel load a part transportation cart with the appropriate parts, and the loaded carts are then delivered to the appropriate workstation along the assembly line. The delivery process often involves towing the carts to the workstation. However, the line-side area of most assembly lines is very crowded and does not allow for the exact placement of a parts cart by a towing rig. Therefore, once the carts reach the assembly line, the carts must be manually moved by the material handling personnel to the correct line-side position for ease of access by the assembly line personnel.

A problem arises in that the carts can be very heavy and difficult to move. This is especially so when the carts are loaded with parts. Therefore, there exists a need or a method and apparatus to make it easier to start moving loaded carts.

SUMMARY

The present invention provides an apparatus and method for reducing or eliminating the effort required by an operator of a delivery cart to start the cart moving as well as to recover some or all of the energy used to start the cart moving.

More specifically, an apparatus according to the present invention is adapted for use in conjunction with a part holding cart and includes a drive wheel, a motor for rotatably driving the drive wheel, and a rechargeable energy source to power the motor. The apparatus further includes an assembly for recharging the rechargeable energy source through rotation of the drive wheel, and a clutch disposed between the motor and the drive wheel to permit the drive wheel to spin freely when not being powered.

In further accordance with the present invention, a method for operating a cart includes energizing the motor and engaging the clutch to drive the drive wheel and initiate movement of the cart, operating a run timer and, when the run timer times-out, sequentially disengaging the clutch and de-energizing the motor.

BRIEF DESCRIPTION OF THE DRAWINGS

These and further features of the invention will be apparent with reference to the following description and drawings, wherein.

DETAILED DESCRIPTION

The invention will now be described in accordance with its preferred embodiments. The description with reference to the figures is intended to simplify the explanation of the invention and is not meant to limit the scope of the invention. The invention will be described in conjunction with a part transportation cart. This is not meant to limit use of the invention to such a cart, as the invention can be used with any assembly having wheels which is at least in part human-powered.

Figure 1:
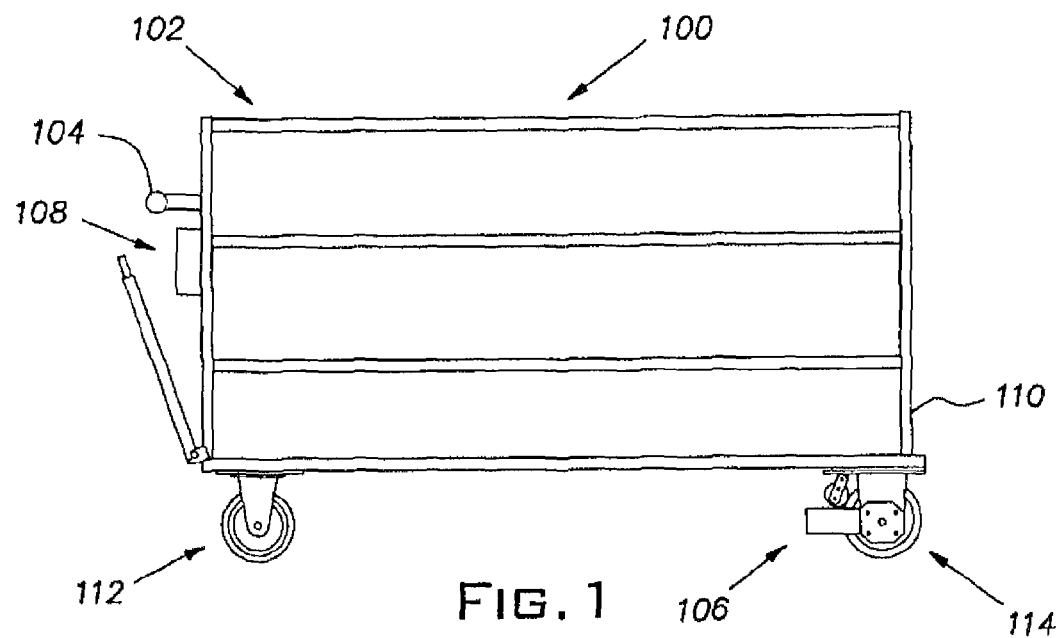
FIG. 1 is a perspective view of a cart used for transporting materials with a motor drive and energy recovery unit according to the present invention.
Figure 2A:
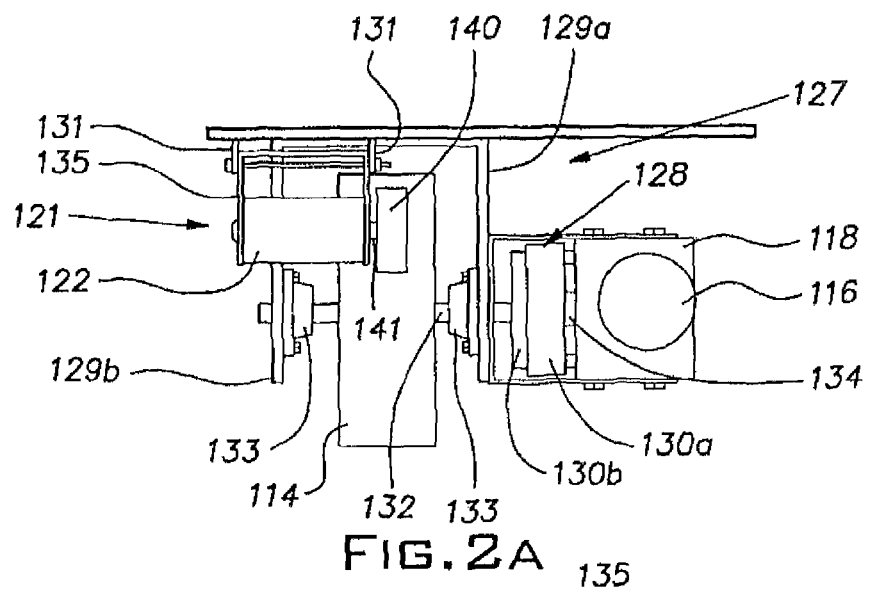
FIG. 2A schematically illustrates a rear view of the wheel unit of the delivery cart with the motor drive and energy recovery unit affixed thereto.
Figure 2B:
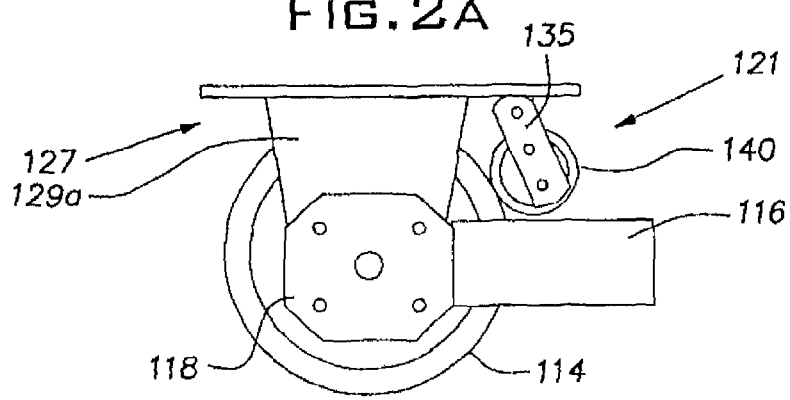
FIG. 2B schematically illustrates a side view of the wheel unit of the delivery cart with the motor drive and energy recovery unit affixed thereto; and, FIG. 3 is a diagram illustrating the operation of the cart's circuitry.
Figure 3:
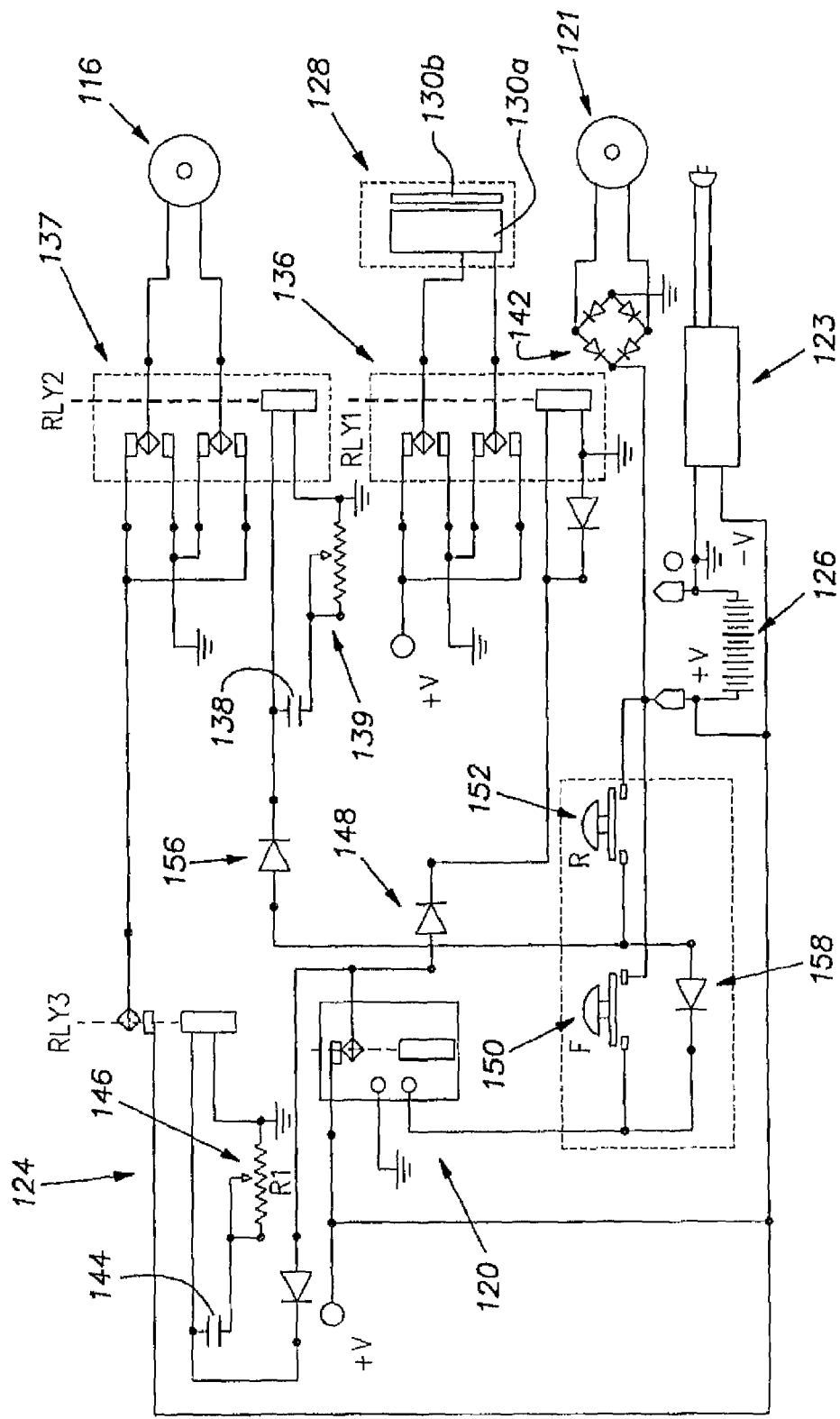

With reference to FIGS. 1-3, an apparatus 100 for cart movement and energy recovery according to the present invention is incorporated into a cart assembly 102, and includes a motor drive and energy recovery unit 106 and a power control unit 108.

The delivery cart assembly 102, which includes a part carrying basket 110 and a plurality of wheels 112, is illustrated as having four vertical walls, a horizontal floor and an open top surface. A handle 104 is affixed to an exterior side of one of the vertical walls of the basket 110 to facilitate manual movement and steering of the cart 102. The wheels 112 are attached to a bottom side of the horizontal floor of the carrying basket 110. Preferably, two of the wheels 112 are swivel-mounted to permit turning of the cart, while one or more of the remaining wheels 112 is a powered or drive wheel 114.

The power control unit 108 is located along a vertical wall of delivery cart assembly 102 near the handle 104. A forward button 150 and a reverse button 152 (FIG. 3) are provided by the power control unit 108 at a location that is convenient for the operator, such as adjacent to or on the handle 104. The power control unit 108 is electrically connected to the motor drive and energy recovery unit 106 and adapted to control energization thereof, as will be apparent from the following description.

The motor drive and energy recovery unit 106 includes the drive wheel 114, a motor 116, a right angle gear reduction unit 118, a run timer 120, a generator assembly 121, a disengaged power supply circuit 124, a battery 126, a mounting assembly 127, a clutch 128, a clutch control circuit 136, and a motor energizing circuit 137.

The mounting assembly 127 includes a mounting plate secured to the underside of the basket 110 from which extend first and second drive wheel supporting brackets 129a, 129b, and a pair of generator assembly support arms 131. A generator bracket 135 is adjustably mounted to the support arms 131 so as to properly position the friction drive wheel 140, described hereinafter, relative to the drive wheel 114. Each of the drive wheel supporting brackets 129a, 129b have bearings 133 mounted thereon to rotatably support the drive wheel shaft 132, as described hereinafter.

An output shaft (not shown) of the motor 116 serves as an input to the gear reduction unit 118. An output shaft 134 of the gear reduction unit 118 serves as an input to the clutch 128, while an output shaft of the clutch 128 serves as a drive wheel shaft 132 that is affixed to the drive wheel 114. As such, the drive wheel 114 is selectively coupled to the motor 116 through the gear reduction unit 118 and the clutch 128.

The clutch 128 is preferably an electrically actuated magnetic clutch having a coil 130a and a drive plate 130b. The coil 130a is attached to the output shaft 134 of the gear reduction unit 118 and, when energized, engages or couples the drive plate 130b, which is secured to the drive wheel shaft 132, to the output shaft 134 and thereby forces the drive wheel shaft 132 to rotate with the output shaft 134 of the gear reduction unit 118. The clutch 128 selectively couples the drive wheel 114 to the motor 116 in response to control signals provided by the power control unit 108 via the clutch control circuit 136, described hereinafter.

With reference to FIG. 2A, the interconnection of the drive wheel 114 with the motor 116 through the gear reduction unit 118 and clutch 128 is shown in more detail. The drive wheel 114 is located on the bottom side of the horizontal floor of the basket 110 between the first and second drive wheel support brackets 129a, 129b. The drive wheel shaft 132, which is affixed to and extends from the clutch drive plate 130b, is rotatably supported by the bearings 133 disposed in the first and second drive wheel support brackets 129a, 129b. As such, the drive wheel 114, drive wheel shaft 132, and clutch drive plate 130b are secured to one another for common rotation about an axis defined by the drive wheel shaft 132.

The gear reduction unit 118 and clutch 128 allow the drive wheel 114 to be selectively coupled to the motor 116 so as to be either driven by the motor or to be free-wheeling. Therefore, the drive wheel 114 is coupled to the motor 116 when the clutch 128 is engaged to permit the motor 116 to drive the drive wheel 114, but is de-coupled from the motor 116 when the clutch 128 is disengaged to permit the drive wheel 114 to freely rotate.

The engagement or coupling of the clutch drive plate 130 to the gear reduction unit output shaft 134 by the clutch 128 is electrically actuated by the clutch control circuit 136. The clutch control circuit 136 is energized by the battery 126 through the run timer 120 when one of the directional buttons 150, 152 is actuated, as will be clear from the following discussion.

The generator assembly 121 includes the generator 122, the generator mounting bracket 135, the friction drive wheel 140, and a rectifier 142 (FIG. 3). The friction drive wheel 140 is mounted upon a generator shaft 141 such that the friction drive wheel 140 and generator 122 rotate as a unit on the generator shaft 141. Rotation of the generator shaft 141 drives the generator 122, causing the generator 122 to generate a current that flows to the rectifier 142 where it is selectively passed through to the battery 126, charging the battery 126. The battery 126 is also connected to a line voltage battery charger 123 (FIG. 3) to permit the battery to be charged via line voltage when the cart is not in use.

The friction drive wheel 140 is in frictional engagement with the outer circumference of the drive wheel 114 such that the friction drive wheel 140 is rotated by the drive wheel 114. The friction drive wheel 140 is preferably made from a high friction material that enhances rotational engagement between the friction drive wheel 140 and the drive wheel 114. Additionally, engagement between the friction drive wheel 140 and the drive wheel 114 can be adjusted via the mounting of the generator assembly bracket 135 and the generator support arms 131 so that the friction drive wheel 140 engages the drive wheel 114 with sufficient pressure to prevent or minimize rotary slippage therebetween.

The power control unit 108 allows the operator to activate the assisted cart motion apparatus 100. The operator activates the apparatus 100 using either the forward button 150 or the reverse button 152, depending on the desired direction of cart 102 motion. The directional buttons 150, 152 are electrically connected to the motor energizing circuit 137 through the run timer 120, and through a directional diode 158 (for the reverse button 152).

With reference to FIG. 3, the electrical circuit of the motor drive and power recovery apparatus 100 according to the present invention is illustrated.

The disengaged power supply circuit 124 includes a disengaged power relay RLY3, a disengaged power capacitor 144, and a variable resistor 146. The disengaged power relay RLY3 is energized via the run timer and electrically connects the motor 116 to the battery 126 upon actuation of the forward button 150. The disengaged capacitor 144 stores energy and supplies current to continue energizing the disengaged power relay RLY3 for a period of time after the run timer 120 has timed-out. As such, the disengaged power supply circuit 124 allows the motor 116 to run briefly after the clutch 128 is de-energized to disengage the motor 116 from the drive wheel 114.

The clutch control circuit 136 includes a clutch relay RLY1 that is energized by an output of the run timer 120 and supplies current to the clutch coil 130a to engage the clutch 128 whenever one of the forward or reverse buttons 150, 152 is actuated.

The motor energizing circuit 137 includes a motor relay RLY2, which has normally closed contacts electrically connected to the motor to energize the motor 116 to operate in the forward direction and normally open contacts that, when closed, energize to operate the motor 116 to operate in the reverse direction. The motor relay RLY2 is energized by actuation of the reverse button 152, described hereinafter, to switch the direction of motor operation. The motor energization circuit further includes a motor capacitor 138 and variable resistor 139 that cooperate to supply power to the energized motor relay RLY2 to maintain reverse-operation of the motor 116 for a predetermined period of time after the run timer 120 times out.

The battery 126 is electrically connected to the run timer 120 through the closed contacts of the forward button 150 or the reverse button 152. When neither button 150, 152 is actuated, the battery 126 is not connected with the run timer 120.

When the forward button 150 is pushed to initiate forward motion, power from the battery 126 is supplied to the run timer 120, and the run timer 120 energizes the relay RLY1 of the clutch control circuit 136 via clutch diode 148, thereby energizing the clutch coil 130a and mechanically coupling the motor 116 to the drive wheel 114, as discussed previously. Battery power is also supplied from the run timer 120 to the disengaged power supply circuit 124, energizing the disengaged power supply relay RLY3 to close its contacts and supply battery power, via the normally closed contacts of the motor relay RLY2, to the motor 116, which operates in the forward direction. Current supplied to the disengaged power supply capacitor 144 charges the capacitor 144, and provides a store of energy that is later used to continue energizing the disengaged power supply relay RLY3 so as to supply battery power to the motor 116 when the run timer 120 times out.

The run timer 120 energizes the clutch 128, and connects the motor 116 to the battery 126 (via the disengaged power supply circuit 124) for a predetermined amount of time after actuation of the forward button 150. After the predetermined amount of time, the switch provided by the run timer 120 opens, cutting off power to the clutch relay RLY1 and to the disengage power supply circuit 124. Cutting off power to the clutch relay RLY1 causes the relay contacts to open, de-energizing the clutch coil 130a and de-coupling the drive wheel 114 from the motor 116.

When the run timer 120 times-out, cutting power off to the disengage power supply circuit 124, the disengage power supply capacitor 144 continues to provide current to the disengage power supply relay RLY3, thereby maintaining power supply to the motor 116 via the normally closed contacts of the motor relay RLY2. Once the capacitor 144 discharges (which is a variable time based upon the setting of the variable resistor 146), the contacts of the disengage power supply relay RLY3 open, and power to the motor 116 is cut off.

Therefore, according to the present invention, the motor 116 continues to operate for a period of time during and after the clutch 128 decouples the drive wheel 114 from the motor 116, and thereby prevents the motor 116 from being a drag on movement of the cart 102 during the interval in which the clutch 128 is decoupling.

On the other hand, when the reverse button 152 is actuated to initiate rearward motion, battery power is supplied to the run timer 120 via the diode 154, and the run timer 120 energizes the relay RLY1 of the clutch control circuit 136 via clutch diode 148, thereby energizing the clutch coil 130a and mechanically coupling the motor 116 to the drive wheel 114, as discussed previously. Current flows through the reverse button 150, via the diode 156, to the coils of the motor relay RLY2 and to the motor capacitor 138. The motor relay RLY2 is energized to close its normally open contacts. Simultaneously, current supplied to the motor capacitor 138 charges the motor capacitor 138, and provides a store of energy that is later used to continue energizing the motor relay RLY2 when the run tinier 120 times out.

Power is also supplied from the run timer 120 to the disengaged power supply circuit 124, energizing the disengaged power supply relay RLY3 to close its contacts and supply battery power to the motor 116 via the normally open contacts of the motor relay RLY2, and thereby energizes the motor 116 to operating in the reverse direction. Current supplied to the disengaged power supply capacitor 144 charges the disengage power capacitor 144, and provides a store of energy that is later used to energize the disengage power supply relay RLY3 when the run timer 120 times out and cuts off power to the disengaged power supply circuit 124. It will be noted that the supply of power to the clutch control circuit 136 and the disengaged power supply circuit 124 when operated in the reverse direction is generally identical to operation in the forward direction, described hereinbefore.

The run timer 120 provides current to the clutch 128 and the motor 116 (via the disengaged power supply circuit 124) for a predetermined amount of time after the reverse button 152 is actuated. After the predetermined amount of time, the switch provided by the run timer 120 opens, cutting off power to the clutch relay RLY1 and to the disengage power supply circuit 124. Cutting off power to the clutch relay RLY1, causes the contacts of the relay RLY1 to open, and de-energizing the clutch coil 130a and de-coupling the drive wheel 114 from the motor 116.

When run timer 120 times-out, cutting power off to the disengage power supply circuit 124, the disengage capacitor 144 continues to energize the disengage power supply relay RLY3, thereby maintaining power supply to the motor 116 via the normally open contacts of the motor relay RLY2. Once the capacitor 144 discharges (which is a variable time based upon the setting of the variable resistor), the contacts of the disengage power supply relay RLY3 open, and power to the motor 116 is cut off.

Similarly, when run timer 120 times-out, power to the motor relay RLY2 is supplied by the motor capacitor 138, which maintains the normally open contacts of the motor relay RLY2 closed for a predetermined amount of time (which is variable based upon the setting of the variable resistor 139). When the motor relay capacitor 138 is completely discharged, the motor relay RLY2 is de-energized and returns to its normal condition.

As will be apparent from the foregoing, the present invention is directed toward power-driving the drive wheel 114 for a predetermined time period to overcome the inertia of the resting cart 102. Once the inertia is overcome and the cart 102 is in motion, the operator effort required to move and direct the cart 102 is sufficiently reduced. Accordingly, the run timer 120 cuts off power to the drive wheel 114 once a sufficient amount of time has passed for the cart 102 to be moving at a predetermined speed in the desired direction. The sufficient amount of time is the predetermined time the run timer 120 allows the motor 116 to remain energized and coupled to drive wheel 114.

With continued reference to FIG. 3, when the cart 102 is being moved in a forward direction such as when being towed or manually pushed, the friction drive wheel 140 and generator shaft 141 cooperate to turn the generator 142, which generates a current that passes through the rectifier 142 and into the battery 126, thereby charging the battery 126. When the cart is moved in a rearward direction, the current generated by the generator is of a reverse polarity, and does not pass the rectifier 142.

it should be noted that the delivery cart apparatus 100 is illustrated as having only one drive wheel 114, however the apparatus 100 can have a plurality of drive wheels 114. Further the drive wheels 114 can be driven by a single motor 116 or they can each have a dedicated motor 116.

While the present invention has been described with particularity herein, it is considered apparent that the present invention is capable of numerous modifications, substitutions, and rearrangements of parts without departing from the scope and spirit of the present disclosure. Therefore, the invention is not to be limited to the particular preferred embodiments described hereinbefore, but is rather only considered to be defined by the claims appended hereto.

What is claimed is:

1. A method for operating a cart having a movement start and energy recovery system, said method comprising:
    moving said cart by exerting an external force from an external source on said cart, the external force causing a plurality of wheels to rotate while the plurality of wheels are disengaged from a motor, said plurality of wheels including a drive wheel;
    recharging a rechargeable power source of said cart while the external force is moving said cart;
    removing said external force from said cart;
    energizing a clutch to couple the motor to the drive wheel;
    activating the motor to drive the drive wheel via the clutch;
    de-energizing the clutch while said motor remains activated; and,
    de-activating the motor.

2. The method according to claim 1, wherein the recharging of the rechargeable power source comprises:
    rotating a friction drive wheel, said friction drive wheel being in frictional engagement with said drive wheel;
    turning a generator with said friction drive wheel, said generator generating a current; and
    supplying the current to the rechargeable energy source and thereby recharging said rechargeable energy source.

3. The method according to claim 1, further comprising:
    charging a disengaged power supply while the clutch is energized; and
    supplying energy from the disengaged power supply to the motor immediately following de-energizing of the clutch.

4. The method according to claim 3, wherein the disengaged power supply is charged with a predetermined amount of energy set to minimize the duration of time which the motor is de-activated following decoupling of the clutch from the motor.

5. A method for operating a cart having a movement start and energy recovery system, comprising:
   energizing a motor operably connected to a drive wheel so as to initiate rotation of the drive wheel;
   de-energizing the motor when the cart has achieved a predetermined speed through rotation of the drive wheel;
   exerting an external force originating from a source independent from the cart on the cart after de-energizing the motor to continue movement of the cart; and
   charging a battery connected to the energy recovery system by rotating a friction drive wheel frictionally engaging the drive wheel while the cart is being moved by the external force exerted thereon.

6. The method according to claim 5, wherein energizing of the motor is accomplished through actuation of a movement button in communication with the motor.

7. The method according to claim 6, wherein energizing of the motor is accomplished through actuation of one of a forward button and a reverse button, each of which are in communication with the motor,
   wherein actuation of said forward button energizes the motor to initiate rotation of the drive wheel in a cart forward direction, and actuation of said reverse button energizes the motor to initiate rotation of the drive wheel in a cart reverse direction.

8. The method according to claim 7, further comprising monitoring the direction of rotation of the drive wheel and preventing charging of the battery if the drive wheel is rotating in the cart reverse direction.

9. The method according to claim 5, wherein charging of the battery is allowed only when the drive wheel is being caused to rotate in a cart forward direction by the external force exerted thereon.

10. The method according to claim 5, wherein the energy recovery system includes a generator rotatably connected to a friction drive wheel frictionally engaged with the drive wheel, and further comprises:
   rotating the friction drive wheel with the drive wheel; and
   generating a current in the generator through rotation of the friction drive wheel.

11. A movement start and energy recovery system for initiating movement of a cart, comprising:
   a motor selectively operably connected to a drive wheel of the cart so as to initiate rotation of the drive wheel;
   a generator operably engaging said drive wheel and configured to generate a current from rotation of the drive wheel, said generator connected to a rechargeable power source;
   a clutch assembly for selectively engaging and disengaging said motor from said drive wheel: and
   a friction drive wheel connected to the generator and frictionally engaging the drive wheel,
   wherein said generator is configured to generate a current from rotation of the drive wheel while the motor is disengaged from the drive wheel, and rotation of the drive wheel rotates the friction drive wheel, and the generator generates the current through the rotation of the friction drive wheel.

12. A movement start and energy recovery system for initiating movement of a cart, comprising: a motor selectively operably connected to a drive wheel of the cart so as to initiate rotation of the drive wheel;
   a generator operably engaging said drive wheel and configured to generate a current from rotation of the drive wheel, said generator connected to a rechargeable power source;
   a clutch assembly for selectively engaging and disengaging said motor from said drive wheel; and
   a rectifier disposed between the generator and the rechargeable power source,
   wherein said generator is configured to generate a current from rotation of the drive wheel while the motor is disengaged from the drive wheel, and said rectifier is configured to allow current of a first polarity associated with rotation of the drive wheel in a cart forward direction to pass to the rechargeable power source, and to prevent current of a reverse polarity associated with rotation of the drive wheel in a cart reverse direction from passing to the rechargeable power source.

13. The system according to claim 11, further comprising a rectifier disposed between the generator and the rechargeable power source,
   wherein said rectifier is configured to allow current of a first polarity associated with rotation of the friction drive wheel in a direction corresponding to cart movement in a forward direction to pass to the rechargeable power source, and to prevent current of a reverse polarity associated with rotation of the friction drive wheel corresponding to cart movement in a reverse direction from passing to the rechargeable power source.

14. The system according to claim 11, further comprising a forward button and a reverse button in communication with the clutch assembly and motor, wherein actuation of the forward button causes the clutch assembly to engage the motor with the drive wheel and initiate rotation of the drive wheel in a cart forward direction, and actuation of the reverse button causes the clutch assembly to engage the motor with the drive wheel and initiate rotation of the drive wheel in a cart reverse direction.

15. The system according to claim 14, further comprising a rectifier disposed between the generator and the rechargeable power source,
   wherein said rectifier is configured to allow current of a first polarity associated with rotation of the drive wheel in the cart forward direction to pass to the rechargeable power source, and to prevent current of a reverse polarity associated with rotation of the drive wheel in a cart reverse direction from passing to the rechargeable power source.

16. The system according to claim 11, wherein the clutch assembly is an electromagnetic clutch configured to engage the drive wheel with the motor when energized and to disengage the drive wheel from the motor when de-energized.

17. The system according to claim 16, further comprising a disengaged power supply connected to the rechargeable power source and the motor, wherein said disengaged power supply is configured to store a predetermined amount of energy while the electromagnetic clutch is energized and to provide said energy to the motor immediately following de-energizing of the electromagnetic clutch.

18. The system according to claim 17, wherein the predetermined amount of energy is at least sufficient to allow the motor to continue running until the electromagnetic clutch has disengaged the motor from drive wheel.

19. The system according to claim 17, wherein the disengaged power supply includes a capacitor for storing energy.

* * * * *